(12) United States Patent  
Conrad et al.

(10) Patent No.: US 6,633,834 B2  
(45) Date of Patent: Oct. 14, 2003

(54) BASELINING OF DATA COLLECTOR DATA

(75) Inventors: Jeffrey Richard Conrad, Fort Collins, CO (US); Gary E. Mayle, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 107 days.

(21) Appl. No.: 09/940,614

(22) Filed: Aug. 29, 2001

(65) Prior Publication Data

US 2003/0046031 A1 Mar. 6, 2003

(51) Int. Cl.[7] .......................... G06F 11/00; G06F 15/00
(52) U.S. Cl. .......................... 702/188; 714/37
(58) Field of Search .......................... 702/188, 81–82, 702/84, 58–59, 179, 182–185, 193; 714/25, 37, 39, 48; 709/223–226

(56) References Cited

U.S. PATENT DOCUMENTS

| | | | | |
|---|---|---|---|---|
| 5,960,435 A | * | 9/1999 | Rathmann et al. | 707/101 |
| 6,005,844 A | * | 12/1999 | Ono et al. | 370/395.7 |
| 6,097,953 A | * | 8/2000 | Bonta et al. | 455/436 |
| 6,182,022 B1 | * | 1/2001 | Mayle et al. | 702/182 |
| 6,182,157 B1 | * | 1/2001 | Schlener et al. | 709/318 |

* cited by examiner

*Primary Examiner*—Marc S. Hoff  
*Assistant Examiner*—Mary Catherine Baran

(57) ABSTRACT

A network management node monitors network attributes of a network. The network management node is connected to network devices through the network and receives data values associated with measured network attributes from said network devices. The data values are stored in the network management node and a baseline value and rearm baseline value for a network attribute are calculated from a plurality of the received data values measured during a first period of time (e.g., a first time bucket). These data values are compared to the baseline value, and an alarm is generated in response to at least one of these data values exceeding the baseline value. The alarm is reset if at least one subsequently measured data value is below the rearm baseline value. The baseline value and rearm baseline value are recalculated from received data values measured during subsequent time buckets. Data values measured during the subsequent time buckets are compared to corresponding baseline and rearm baseline values.

20 Claims, 5 Drawing Sheets

US 6,633,834 B2

BASELINING OF DATA COLLECTOR DATA

FIELD OF THE INVENTION

The present invention is generally related to management of a computer network. More particularly, the present invention is related to improving the accuracy in the analysis of data collected from remote devices connected to the network.

BACKGROUND OF THE INVENTION

Network communications have become a fundamental part of today's computing. As networks grow larger, increasingly complex, and interface with a variety of diverse networks, the task of monitoring and maintaining a network also becomes increasingly complex.

To assist a network manager, network management software ("NMS") may be used in the management of a network. A conventional NMS may typically be executed on a management device or node of the network. From the management node, the conventional NMS may be configured to determine a network topology, detect malfunctioning remote network devices or communication links, monitor network traffic, and the like.

As part of the monitoring duties, the network manager may configure the NMS to occasionally query or poll remote network devices for information. The information may include status data, port information, address, and the like. The information required may be crucial for the network manager to assess the overall status of the network.

FIG. 5 illustrates a block diagram of a conventional management node or device 500 implementing a conventional data collection from a remote node. In particular, the management node 500 includes a NMS 510 and a network interface 520. The NMS 510 may be configured to provide the functionality for a network manager to manage a network 515 through the network interface 520.

The NMS 510 may include a data collector module 530 configured to retrieve user specified information at a scheduled time from remote devices 525a ... 525n over the network 515, i.e., a data collection event. The data collector module 530 may retrieve the selected information from at least one of the remote device 525a ... 525n and store the selected information in an associated output file in the management node 500. The associated output file may be analyzed by additional network tools of the NMS 510 to assist in the assessment of the status and maintenance of the network 515.

The results of an analysis of the associated output file may be skewed. Typically, network systems experience regular patterns of network traffic (i.e., data/command packets traversing a network). A typical pattern may be a high volume of network traffic during the morning hours of a work week resulting from, for example, users checking their electronic mail in the morning), followed by a steady volume of network traffic for the rest of the day. The network traffic volume may subsequently drop during the evening hours as users end their respective work days.

Network traffic pattern on working days of a week may be markedly different than on a weekend. Weekend activity may include occasional network administration traffic (e.g., back-up, maintenance commands, etc.) along with an occasional weekend user. The weekend network traffic pattern may also be markedly different from overnight traffic pattern during the working days of a week. This overnight activity may consist entirely of network administration traffic and/or time-intensive computations.

If the results of the analysis of the associated output file are used to determine a performance threshold for incoming data, the performance threshold computation may be skewed. For a typical performance threshold computation, most conventional network management systems use all the relevant collected data value points to calculate a given performance threshold. As a result, the given performance threshold may not take into account the varying network traffic patterns that may occur during a week or during a given time period. Accordingly, a weekend data point, which may not be an aberration when compared with comparable weekend data points, may be an aberration when compared with the combined data points.

The aberrations may generate unnecessary alarms (or alerts) to a network manager, and the unnecessary alarms may present an erroneous picture of the state of a network. As a result, a network manager may unnecessarily adjust performance parameters of the network to accommodate the unnecessary alarms, which may lead to an inefficient allocation of network resources. Additionally, the generation of unnecessary alarms may lead a network manager to assume that all alarms from the NMS are trivial. Thus, the network manager may ignore meaningful alarms that arrive from the NMS.

One solution to the generation of unnecessary alarms is a proposal where a sliding window of time is utilized to create the appropriate thresholds. The technique is fully described by U.S. Pat. No. 6,182,022 to Mayle et al., the subject matter of which is herein incorporated by reference.

In the Mayle technique, a subset of data points collected during a sliding window of time T1 (e.g., a week or a month) are used by a statistical analyzer to calculate a baseline for a monitored performance parameter or attribute. The subset of data points may be collected during a period of time within time T1, such as during normal business hours of a week or a month. The baseline is calculated based on the subset of data points and represents a normal operating range for the monitored performance parameter during the sliding window of time. The baseline is subsequently utilized to generate a new performance threshold. However, although the sliding window of time may take into account the varying amount of network traffic over an extended period of time, the technique does not account for performance parameters that may vary from a calculated threshold in a limited period of time. Furthermore, conventional techniques, including the Mayle technique, do not disclose a method for resetting an alarm.

SUMMARY OF THE INVENTION

The invention facilitates improved computer network monitoring. In one respect, an exemplary embodiment of the present invention includes a method of monitoring network attributes. The method includes: receiving a first plurality of data values for a network attribute; generating an alarm in response to at least one data value of the first plurality of data values exceeding a first threshold for the network attribute; and resetting the alarm in response to a data value not exceeding a second threshold for the network attribute. The second threshold is within the first threshold (e.g., below the first threshold or within a range of the first threshold), and the data value is a data value that was measured subsequent to the at least one data value that caused the alarm to be generated. The method further includes steps of calculating the first threshold based on the first plurality of data values, wherein the first plurality of data values are measured during a first predetermined period of time; and comparing the first plurality of data values to the first threshold. The method further includes steps of recalculating the first threshold based on a second plurality of received data values measured during a second predetermined period of time, subsequent the first period of time; comparing the second plurality of data values to the recalculated first threshold; and generating a second alarm after the alarm is reset in response to at least one of the second plurality of data values exceeding the recalculated first threshold. The first predetermined period of time and the second predetermined period of time may approximately be one hour time intervals. Also, the first and second thresholds and subsequently recalculated thresholds may include a single value or a range of values.

Exemplary methods of the present invention include steps that may be performed by computer-executable instructions executing on a computer-readable medium.

In another respect, an exemplary embodiment of the present invention includes an apparatus operable to monitor a plurality of network attributes. The apparatus includes a data collector configured to receive a first plurality of data values for a network attribute from a plurality of network devices via a network; a threshold calculator configured to calculate a first threshold for the network attribute and a second threshold for the network attribute from the first plurality of data values, the second threshold being within the first threshold; and a threshold comparator configured to compare the first plurality of data values to the first threshold and generate an alarm signal in response to at least one of the first plurality of data values exceeding the first threshold. The threshold comparator is further configured to generate a reset signal after the alarm signal is generated in response to a data value not exceeding a second threshold for the network attribute.

In comparison to known prior art, certain embodiments of the present invention are capable of achieving certain advantages, including some or all of the following: (1) data collection configuration can be easily customized; (2) automatic alarm resetting is provided; and (3) accurate alarm event detection is provided using data values measured during a limited period of time. Those skilled in the art will appreciate these and other advantages and benefits of various embodiments of the invention upon reading the following detailed description of a preferred embodiment with reference to the below-listed drawings.

BRIEF DESCRIPTION OF THE DRAWINGS

The present invention is illustrated by way of example and not limitation in the accompanying figures in which like numeral references refer to like elements, and wherein.

DETAILED DESCRIPTION OF THE INVENTION

In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
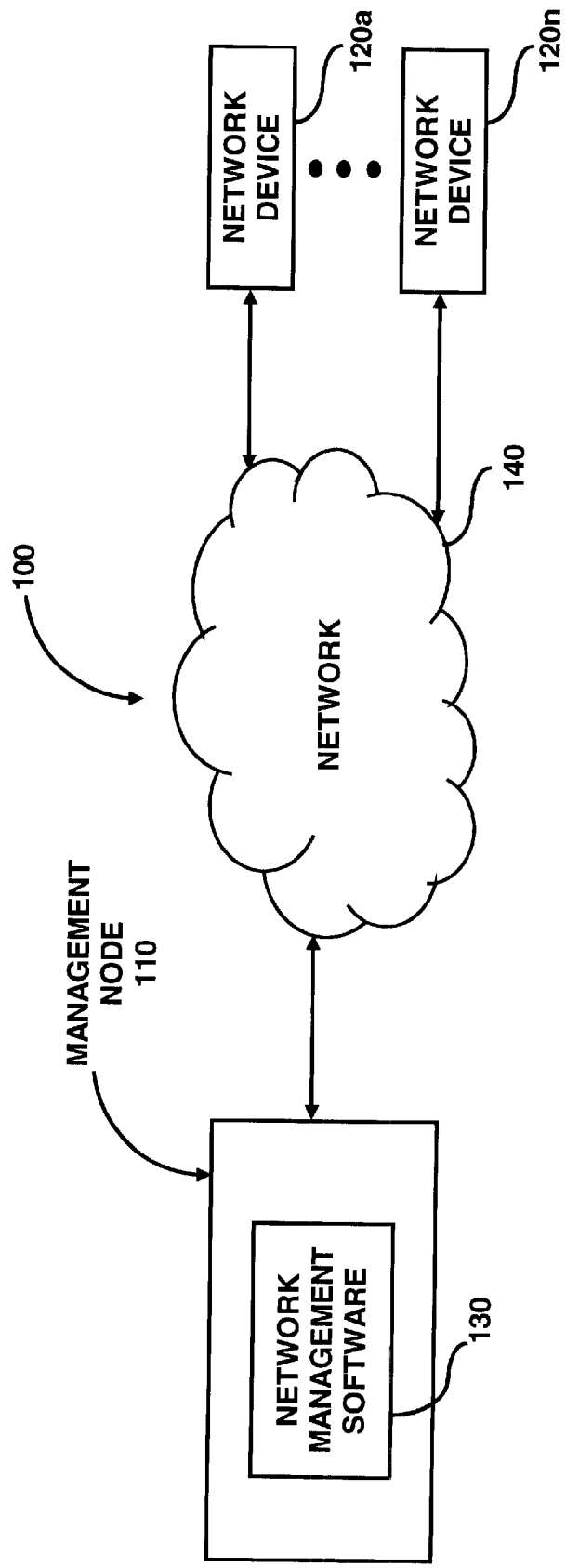
FIG. 1 illustrates a block diagram of a network where an exemplary embodiment of the present invention may be practiced.

FIG. 1 illustrates a block diagram of a network 100 where an exemplary embodiment of the present invention may be practiced. In particular, the network 100 includes a management node 110 interfaced with remote network devices 120a . . . 120n via network 140 and managed by a NMS 130. The management node 110 may be configured to provide network management services to the remote network devices 120a . . . 120n through the network 140. The management node 110 may provide the capability of monitoring, troubleshooting, and/or diagnosing of the remote network devices 120a . . . 120n and the network 140. The management node 110 may be implemented with a server, a workstation, a personal computer or the like. The remote network devices 120a . . . 120n may be a variety of electronic devices such as printers, scanners, servers, workstations, personal computers, and the like.

The network 140 may be configured to provide a communication path between the management node 110 and the remote network devices 120a . . . 120n. The network 140 may be implemented using network protocols such as Ethernet, token ring, X.25, simple network management protocol ("SNMP"), etc.

Figure 2:
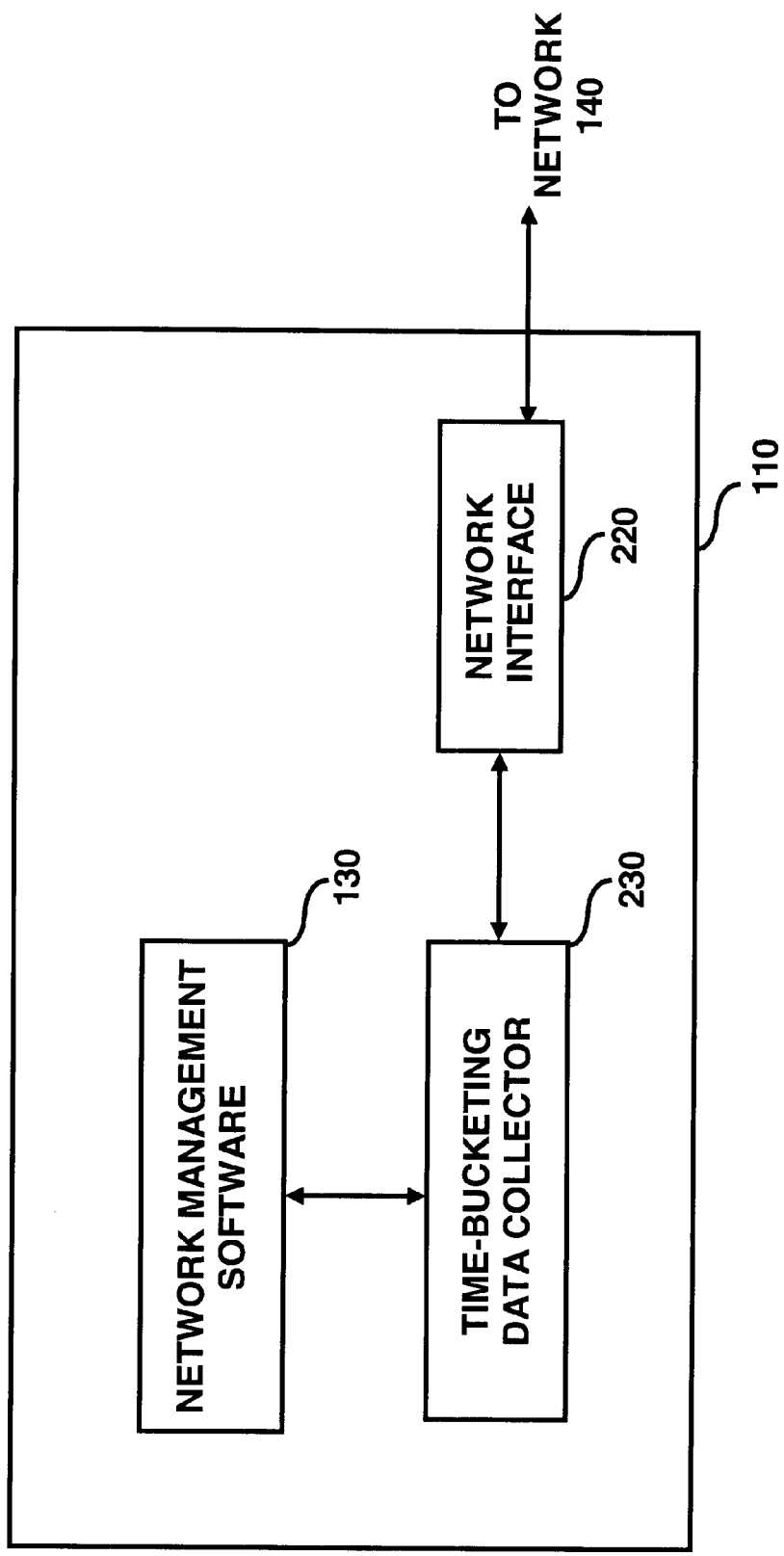
FIG. 2 illustrates a more detailed block diagram of an exemplary management node employing the principles of the present invention.

FIG. 2 illustrates a detailed block diagram of an exemplary embodiment of the management node 110. In particular, the management node 110 includes the NMS 130. As discussed above, the capabilities of the management node 110 to monitor, troubleshoot and diagnose the computer network 130 may be implemented utilizing the NMS 130. As part of the monitoring function of the NMS 130, the NMS 130 may be configured to retrieve network attributes from remote devices (e.g., remote devices 120a . . . 120n) or nodes through a network interface 220 of the management node 110. The network attributes may include data values related to one or more network attributes (e.g., status, transactional data, port data, address data, network performance parameters, and the like) measured by a network device. The network attributes may be collected, stored and later analyzed by other network tools (or functions) to monitor and/or maintain the network 140.

The time-bucketing data collection module 230 may be configured to retrieve network attributes from remote network devices and/or to collate (or sort) the retrieved information into time interval bins (or time-buckets) to assist in the maintenance of a network. For example, each time-bucket includes data values (e.g., measurement of a network attribute) measured by remote devices 120a . . . 120n during a predetermined period of time, such as during a one hour time interval. It will be apparent to one of ordinary skill in the art that the length of the time-bucket is not limited to one hour and may be adjusted by a network administrator.

The time-bucketing data collection module 230 calculates a baseline value (e.g., a normal operating range for a network attribute) for a time-bucket using the sorted data values for the network attributes. Then, the baseline value is recalculated for network attributes corresponding to a subsequent time-bucket. Accordingly, the baseline value is continuously recalculated for each time-bucket and network attribute. Data values for a particular network attribute and time-bucket received by the management node 110 are compared to a calculated baseline value for that time-bucket and that network attribute. If the incoming information is outside the baseline value, an alarm may be generated by an alarm module of the time-bucketing data collection module 230.

Figure 3:
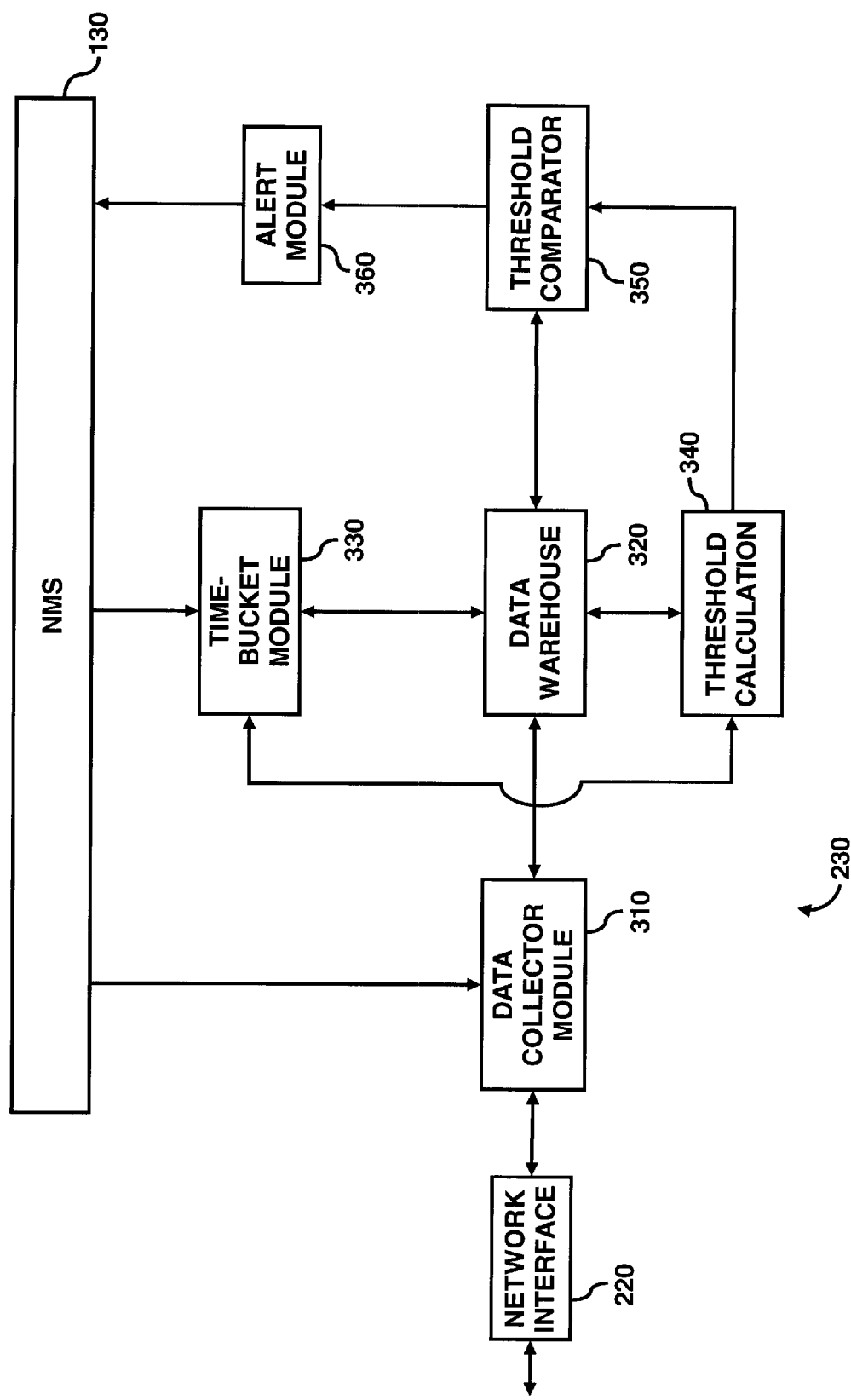
FIG. 3 illustrates a detailed block diagram of an exemplary time-bucketing data collector shown in FIG. 2, according to the principles of the present invention.

FIG. 3 illustrates a more detailed block diagram of the time-bucketing data collection module 230, shown in FIG. 2, according to the principles of the present invention. As shown in FIG. 3, the time-bucketing data collection module 230 may include a data collector module 310, a data warehouse 320, a time-bucket module 330, a threshold calculation module 340, a threshold comparator module 350, and an alert module 360.

The data collector module 310 of the time-bucketing data collection module 230 may be configured to retrieve data values for user-specified network attributes from remote network devices (e.g., remote devices 120a . . . 120n) at scheduled intervals as described in U.S. patent application Ser. No. 09/704,730, entitled "System for Self-Monitoring of SNMP Data Collection Process", herein incorporated by reference. The data collector module 310 may be configured to retrieve the user-specified information (e.g., data values for network attributes) by opening up a communication channel, e.g., a socket, for each remote network device and querying the remote network device through the network interface 220 of the management node 110.

The data warehouse 320 of the time-bucketing data collection module 230 may be configured to provide storage and/or retrieval of data values retrieved from the remote network devices. The data warehouse 320 may be implemented by a memory controller (not shown) and a random access memory, flash memory, hard disk storage or the like.

Alternatively, the data warehouse 320 may be configured to store the incoming information into memory blocks, where each memory block represents a time-bucket/interval/bin. As the data values are retrieved, the memory controller may reference the time-bucket module 330 to determine the appropriate time-bucket for an incoming data value.

The time-bucket module 330 of the time-bucketing data collection module 230 may be configured to provide a user the capability to define buckets, intervals or bins of time over a course of a week to sort the received information. A known trend in network traffic patterns is a given network traffic pattern tends to occur at similar times and similar days. Thus, by providing the capability to set up time-buckets/bins/intervals, information may be sorted or binned according to the temporal occurrence of a given network traffic pattern and stored in the data warehouse 320 by time-bucket. The sorted information may be utilized to provide a more accurate analysis of the state of the network during the captured time because the analysis will include information of the given network traffic pattern. U.S. patent application Ser. No. 09/818,730, entitled System For Time-Bucketing Of Baselined Data Collector Data, herein incorporated by reference, discloses a user-defined time-bucket.

The threshold calculation module 340 of the time-bucket data collection module 230 may be configured to calculate a baseline value for a monitored network attribute of the network 100. A technique for calculating a baseline value is described in U.S. Pat. No. 6,182,022 (Mayle et al.), herein incorporated by reference. For example, the threshold calculation module 340 retrieves data values for a particular network attribute N1 and a particular time-bucket T1 from the data warehouse 320. The threshold calculation module 320 then performs a statistical analysis on the data values to generate a normal operating range for the network attribute N1 for that period of time (i.e., during the interval of the time-bucket T1). The statistical analysis may include calculating a mean M1 of the network attribute N1 measured during the time-bucket T1, and calculating a normal operating range, such as plus or minus three standard deviations from the mean M1. The baseline value may include the calculated normal operating range or a threshold approximately equal to the mean M1 plus three standard deviations. It will be apparent to one of ordinary skill in the art that the baseline value may be calculated using other statistical analysis or using a different number of standard deviations.

The threshold calculation module 340 may also be configured to calculate a rearm baseline value, which includes a range within the calculated normal operating range of the baseline value (e.g., plus or minus one standard deviation from the mean M1) or a threshold below the threshold of the baseline value. It will be apparent to one of ordinary skill in the art that the rearm baseline value may be calculated using other statistical analysis or using a different number of standard deviations. The rearm baseline value is used to determine when to reset an alarm after an alarm is generated in response to a data value for a network attribute being outside a baseline value (e.g., being outside a normal operating range or exceeding a threshold). For example, if an alarm is generated in response to one or more data values exceeding a baseline value, the alarm may not be regenerated if another data value exceeds the baseline value. However, if one or more data values are received that do not exceed the rearm baseline value, the alarm is reset and may be generated again. The rearm baseline value may be a threshold or a range. Accordingly, if one or more data values are received and are within the range of the baseline value or below the threshold of the baseline value, the alarm is reset.

The threshold calculation module 340 may be configured to retrieve recently received data values for a network attribute from the data warehouse 320 and recalculate baseline values and rearm baseline values for different time-buckets. The threshold comparator module 350 may be configured to compare data values for the corresponding time-bucket to the baseline value and rearm value if necessary. If the data values exceed the baseline value, the threshold comparator module 350 may notify the alert module 360.

The alert module 360 of the data collection module 230 may be configured to generate an alarm to the network management system 130 in response to a notification of a data value exceeding or being outside the range of the baseline value.

Figure 4:
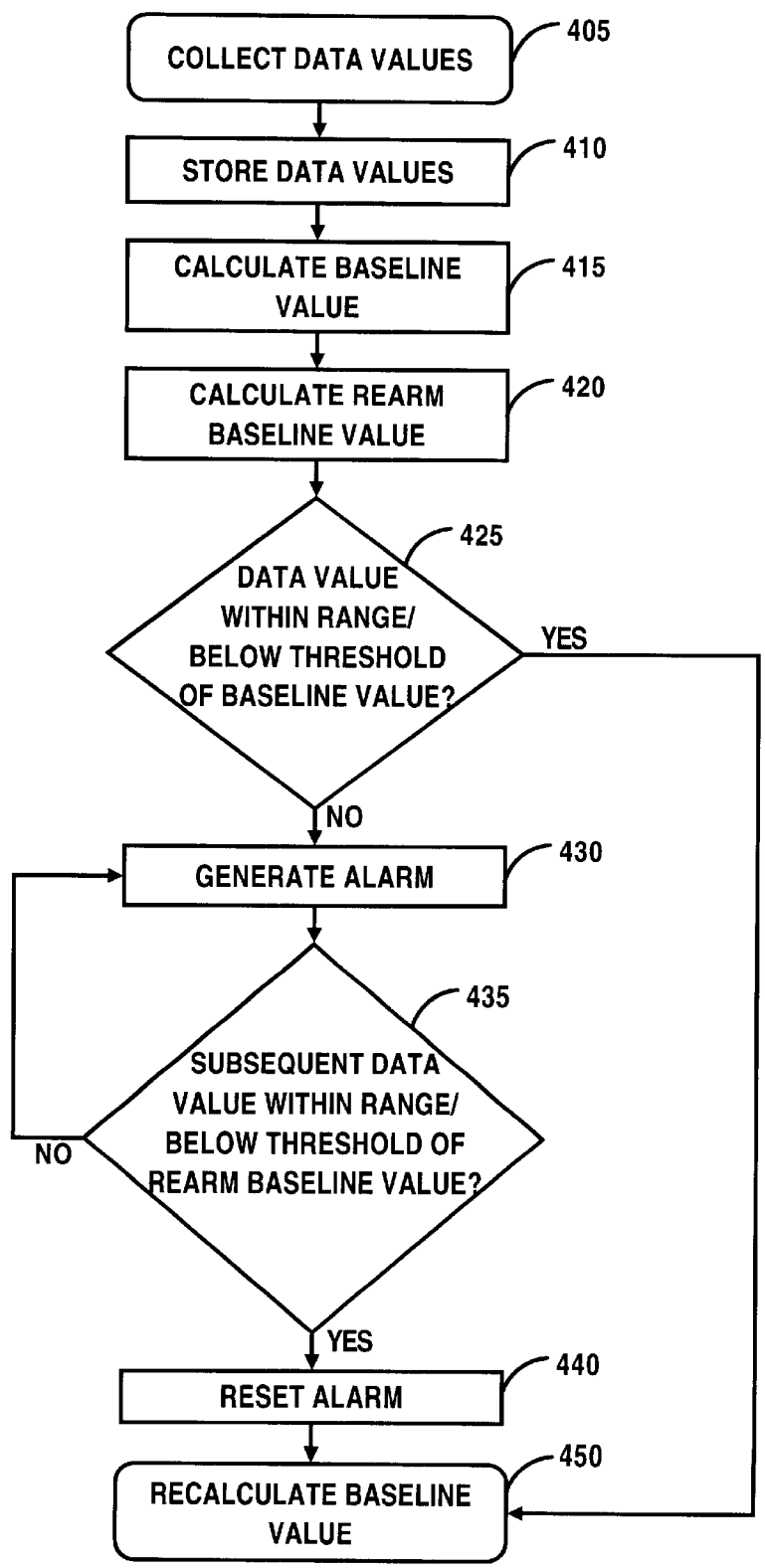
FIG. 4 illustrates an exemplary flow diagram of a method employing the principles of the present invention.
Figure 5:
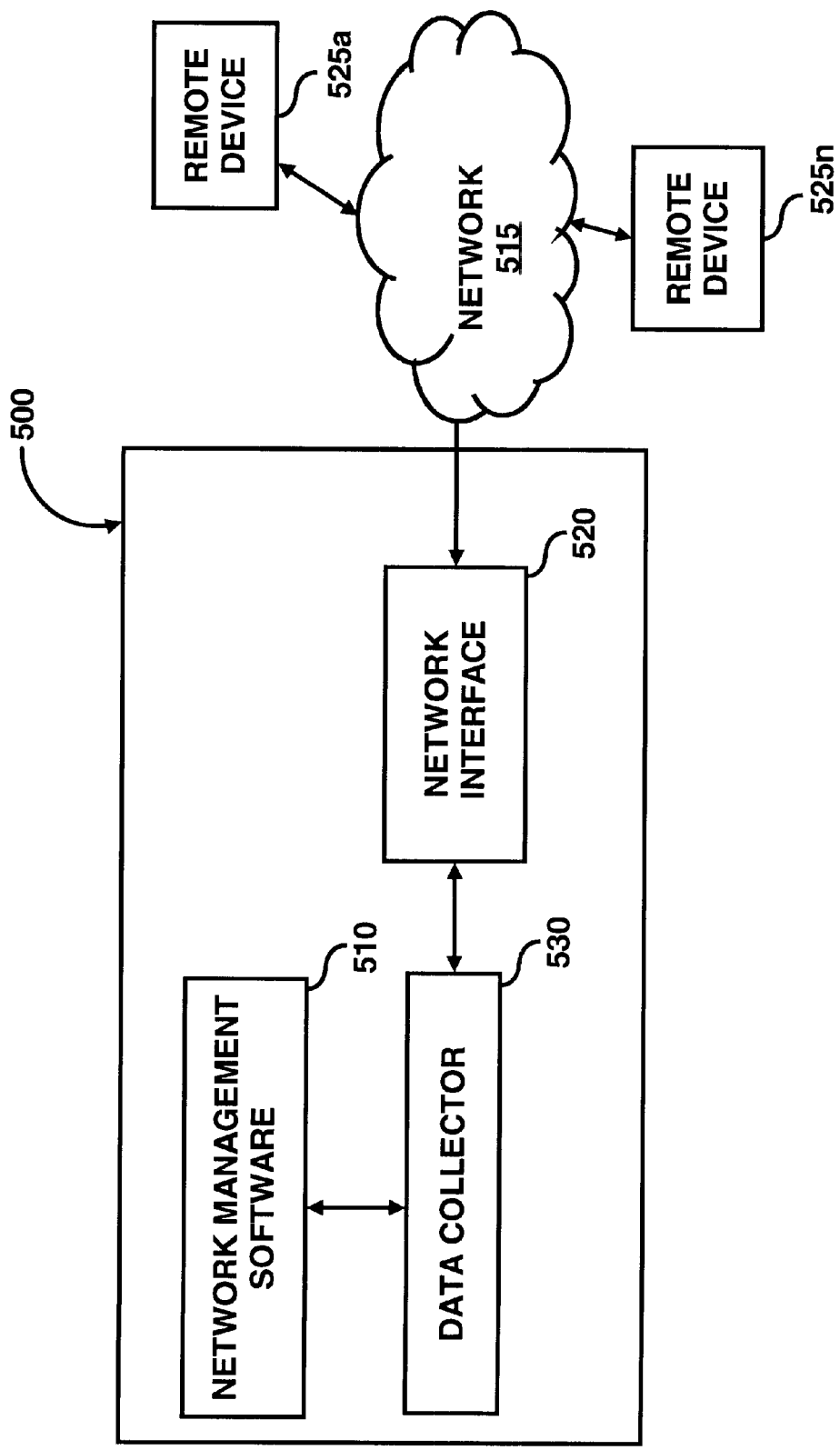
FIG. 5 illustrates a block diagram of a conventional management node or device implementing a conventional data collection technique from a remote node.

FIG. 4 illustrates a flow diagram of an exemplary method 400 employing the principles of the present invention. In step 405, data values for a network attribute are collected. For example, the data collector module 310 receives data values for a network attribute from the remote devices 120a . . . 120n via the network 100. In step 410, the data values are stored in the data warehouse 320. The time-bucket module 330 may parse the received data values by time bucket and/or network attribute.

In step 415, the threshold calculation module 340 calculates a baseline value. For example, data values D1 are retrieved from the data warehouse that are for a network attribute and that are in a time-bucket T1. Time-bucket T1, for example, may include a one hour period of time in which the data values D1 were measured by the remote network devices 120a ... 120n. A baseline value is calculated for the data values D1. As described above and for illustration purposes only, the baseline value may be calculated based on a statistical analysis, such as a mean plus three standard deviations for a threshold. If the baseline value is a range, the range may include the mean of D1 plus or minus three standard deviations.

In step 420, the threshold calculation module 340 calculates a rearm baseline value using the data values (e.g., data values D1) that were used to calculate the baseline value in step 415. As described above and for illustration purposes only, the rearm baseline value may be the mean plus one standard deviation for a threshold or the mean plus or minus one deviation for a range. The baseline value and the rearm baseline value for the time-bucket T1 may be stored in the data warehouse 320.

In step 425, the threshold comparator module 350 compares the data values (e.g., data values D1) to the calculated baseline value. If the data values are outside the range of the calculated baseline value or exceed a threshold of the calculated baseline value, then the threshold comparator module 350 transmits an alarm event notification signal to the alert module 360. The alert module 360 generates an alarm (step 430) in response to receiving the alarm event notification signal. If the data values are within the range of the baseline value or do not exceed the threshold of the baseline value, then the baseline value is recalculated for a next time-bucket (step 450). If at least one data value exceeds the baseline value in step 425, then an alarm is generated in step 430. Alternatively, to minimize false alarms, more than one data value may be required to exceed the baseline value to generate an alarm and/or data values may be required to exceed the baseline value for a predetermined period of time to generate an alarm.

In step 435, the threshold comparator module 350 compares subsequent data values (e.g., data values measured after D1) to the rearm baseline value. The threshold comparator 350 may compare subsequent data values to the rearm baseline value until a subsequent data value is within a range of the rearm baseline value or below a threshold of the rearm baseline value (step 435). Then, the threshold comparator module 350 transmits an alarm reset signal to the alert module 360. The alert module 360 resets the alarm generated in step 430 in response to receiving the alarm reset signal (step 440). Then, the baseline value and rearm baseline value are calculated for the next time-bucket (step 450). The next time-bucket, for example, may include the next time-bucket after time-bucket T1. Alternatively, the next time-bucket may include the next time-bucket after a subsequent data value that is used to reset an alarm.

If at least one data value does not exceed the rearm baseline value in step 435, then the alarm may be reset in step 440. Alternatively, to prevent an alarm from being reset when an alarm event has not ceased, more than one data value may be required to be within the rearm baseline value to reset the alarm and/or data values may be required to be within the rearm baseline value for a predetermined period of time to reset the alarm.

The method shown in FIG. 4 and described above can be performed by a computer program. The computer program can exist in a variety of forms both active and inactive. For example, the computer program can exist as software comprised of program instructions or statements in source code, object code, executable code or other formats; firmware program(s); or hardware description language (HDL) files.

Any of the above can be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of executable software program(s) of the computer program on a CD ROM or via Internet download. In a sense, the Internet itself, as an abstract entity, is a computer readable medium. The same is true of computer networks in general.

While this invention has been described in conjunction with the specific embodiments thereof, it is evident that many alternatives, modifications and variations will be apparent to those skilled in the art. There are changes that may be made without departing from the spirit and scope of the invention.

What is claimed is:

1. A method for monitoring a plurality of system attributes comprising:

calculating alarm set and reset thresholds for an attribute in a first user-defined time interval based on the attributes's data values in the first time interval, the reset threshold being within the set threshold;

determining whether any data values in the first time interval exceed the alarm set threshold for the attribute in the first time interval;

when at least one data value in the first time interval exceeds the attribute's alarm set threshold for the first time interval, initiating an alarm until a subsequently-received second data value for the attribute does not exceed the alarm reset threshold value for the attribute and first time interval, and repeating the calculating and determining steps for a second user-defined time interval commencing subsequent to the receipt of the second data value; and when no attribute data value in the first time interval exceeds the attribute's alarm set threshold for the first time interval, repeating the calculating and determining steps for a second user-defined time interval commencing subsequent to the first time interval.

2. The method of claim 1, further comprising:

receiving data values for at least one system attribute; and storing in memory the received attribute data values in accordance with user-defined time-intervals.

3. The method of claim 2, wherein receiving data values for at least one system attribute comprises:

receiving attribute data values from a plurality of network devices connected to a network.

4. The method of claim 1, wherein the first time interval and the second time interval are each approximately one hour time intervals.

5. The method of claim 1, wherein initiating an alarm when at least one data value in the first time interval exceeds the attribute's alarm set threshold for the first time interval comprises:

initiating an alarm in response to a plurality of interval data values in the first time interval exceeding the alarm set threshold for the first time interval for a predetermined period of time.

6. The method of claim 1, wherein calculating alarm set and reset thresholds comprises:

setting the alarm set threshold for the first time interval equal to a first predetermined number of standard deviations from a mean of the data values in the first time interval; and setting the alarm reset threshold for the first time interval equal to a second number of standard deviations from said the mean of the data values in the first time interval.

7. The method of claim 1, wherein calculating alarm set and reset thresholds comprises:

setting the alarm set threshold for the first time interval equal to approximately three standard deviations from the mean of the data values in the first time interval; and setting the alarm reset threshold for the first time interval equal to approximately one standard deviation from the mean of the data values in the first time interval.

8. The method of claim 1, wherein calculating alarm set and reset thresholds comprises:

setting the alarm set threshold equal to a first range of values; and setting the alarm reset threshold equal to a second range of values.

9. The method of claim 1, wherein the plurality of system attributes comprises at least one network attribute.

10. An apparatus operable to monitor a plurality of attributes of a system, comprising:

a threshold calculator configured to calculate alarm set and reset thresholds for an attribute in a first user-defined time interval based on the attribute's data values in the first time interval, the reset threshold being within the set threshold; and a threshold comparator configured to determine whether any data values in the first time interval exceed the alarm set threshold for that attribute in the first time interval, wherein when at least one data value in the first time interval exceeds the attribute's alarm set threshold for that time interval, the threshold comparator initiates an alarm condition until a subsequently-received second data value does not exceed the alarm reset threshold for the attribute and first time interval, and the threshold calculator calculates the alarm set and reset thresholds for a second user-defined time interval commencing subsequent to the subsequently-received second data value, and when at least one data value in the first time interval does not exceed the attribute's alarm set threshold for the time interval, the threshold calculator and threshold comparator operate on a second user-defined time interval commencing subsequent to the first user-defined time interval.

11. The apparatus of claim 10, further comprising:

a data collector configured to receive data values for at least one system attribute, and to store in memory the received attribute data values in accordance with user-defined time-intervals.

12. The apparatus of claim 10, further comprising:

an alert generator configured to generate an alarm in response to the alarm condition controlled by the threshold comparator.

13. The apparatus of claim 10, further comprising:

a data warehouse configured to store attribute data values received from a plurality of network devices.

14. The apparatus of claim 10, further comprising:

a time bucketor configured to store in memory the received data values in accordance with user-defined time-intervals.

15. A computer readable medium on which is embedded a program, the program performing a method of monitoring a plurality of attributes of a system, said method comprising:

calculating alarm set and reset thresholds for an attribute in a first user-defined time interval based on the attribute's data values in the first time interval, said reset threshold being within said set threshold;

determining whether any data values in the first time interval exceed the alarm set threshold for the attribute in the first time interval;

when at least one data value in the first time interval exceeds the attribute's alarm set threshold for the first time interval, initiating an alarm until a subsequently-received second data value for the attribute does not exceed the alarm reset threshold value for the attribute and first time interval, and repeating the calculating and determining steps for a second user-defined time interval commencing subsequent to the second data value; and when no attribute data value in the first time interval exceeds the attribute's alarm set threshold for the first time interval, repeating the calculating and determining steps for a second user-defined time interval commencing subsequent to the first time interval.

16. The computer readable medium of claim 15, wherein said method further comprises:

receiving data values for at least one system attribute; and storing in memory the received attribute data values in accordance with user-defined time-intervals.

17. The computer readable medium of claim 16, wherein receiving data values for at least one system attribute comprises:

receiving data values from a plurality of network devices connected to a network.

18. The computer readable medium of claim 16, wherein initiating an alarm when at least one data value in the first time interval data value exceeds the attribute's alarm set threshold for the first time interval comprises:

initiating an alarm in response to a plurality of data values in the first time interval each exceed the alarm set threshold for the first time interval for a predetermined period of time.

19. The computer readable medium of claim 16, wherein calculating alarm set and reset thesholds comprises:

setting the alarm set threshold for the first time interval equal to approximately three standard deviations from the mean of the data values in the first time interval; and setting the alarm reset threshold for the first time interval equal to approximately one standard deviation from the mean of the data values in the first time interval.

20. The computer readable medium of claim 15, wherein calculating alarm set and reset thresholds comprises:

setting the alarm set threshold for the first time interval equal to a first predetermined number of standard deviations from a mean of the data values in the first time interval; and setting the alarm reset threshold for the first time interval equal to a second number of standard deviations from the mean of the data values in the first time interval.

* * * * *